(12) United States Patent
Gotzig et al.

(10) Patent No.: US 7,268,732 B2
(45) Date of Patent: Sep. 11, 2007

(54) RADAR SENSOR FOR USE WITH AUTOMOBILES

(75) Inventors: Heinrich Gotzig, Heilbronn (DE); Dirk Walz, Wemding (DE); Bernd Biehlman, Ludwigsburg (DE); Uwe Papziner, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 10/556,507

(22) PCT Filed: Apr. 1, 2004

(86) PCT No.: PCT/EP2004/003433

§ 371 (c)(1),
(2), (4) Date: Nov. 14, 2005

(87) PCT Pub. No.: WO2004/102221

PCT Pub. Date: Nov. 25, 2004

(65) Prior Publication Data

US 2006/0256026 A1 Nov. 16, 2006

(30) Foreign Application Priority Data

May 13, 2003 (DE) ............................... 103 22 371

(51) Int. Cl.
*H01Q 1/32* (2006.01)

(52) U.S. Cl. .............................. 343/713; 343/700 MS; 342/70; 342/175

(58) Field of Classification Search ................ 343/700, 343/711, 713, 792.5, 700 MS; 342/70, 175
See application file for complete search history.

(56) References Cited

U.S. PATENT DOCUMENTS 3,577,196 A * 5/1971 Pereda ....................... 343/770
4,772,890 A * 9/1988 Bowen et al. ....... 343/700 MS
5,202,701 A 4/1993 Casey (Continued)

FOREIGN PATENT DOCUMENTS

GB 2 184 605 6/1987

(Continued)

OTHER PUBLICATIONS

Giubbolini L: "Microwave Imaging Radar in the Near Field for Anti-Collision (Miranda)". IEEE Transactions on Microwave Theory and Techniques, IEEE Inc. New York, US, vol. 47, No. 9, Part 2, Sep. 1999, pp. 1891-1900, XP000852109.

(Continued)

*Primary Examiner*—Tho Phan
(74) *Attorney, Agent, or Firm*—Paul Vincent

(57) ABSTRACT

The invention relates to a radar sensor (10) for use with automobiles. Said radar sensor emits pulsed radiation. The radar sensor is characterized in that it comprises an antenna with at least one layer-structured block (34) consisting of metal layers (36, 38, 40, 42) which are arranged according to the Yagi principle and which are respectively separated from each other by a dielectric intermediary layer (46, 48, 50). At least one of the metal layers (36, 38, 40, 42) is excited by a supply system (18) with a radar frequency.

10 Claims, 3 Drawing Sheets

U.S. PATENT DOCUMENTS

| | | | | |
|---|---|---|---|---|
| 5,831,571 A | * | 11/1998 | Rickett | ........................ 342/62 |
| 6,114,997 A | | 9/2000 | Lee et al. | |
| 6,879,034 B1 | * | 4/2005 | Yang et al. | ................. 257/700 |
| 2002/0163478 A1 | | 11/2002 | Pleva et al. | |

FOREIGN PATENT DOCUMENTS

| GB | 2184605 | * | 6/1987 |
|---|---|---|---|
| WO | WO 01/73892 | | 10/2001 |

OTHER PUBLICATIONS

Spencer D G: "Novel Millimeter ACC Antenna Feed" IEE Colloquium on Antennas for Automotives, IEE, London,, GB. Mar. 10, 2000, pp. 411-419.

* cited by examiner

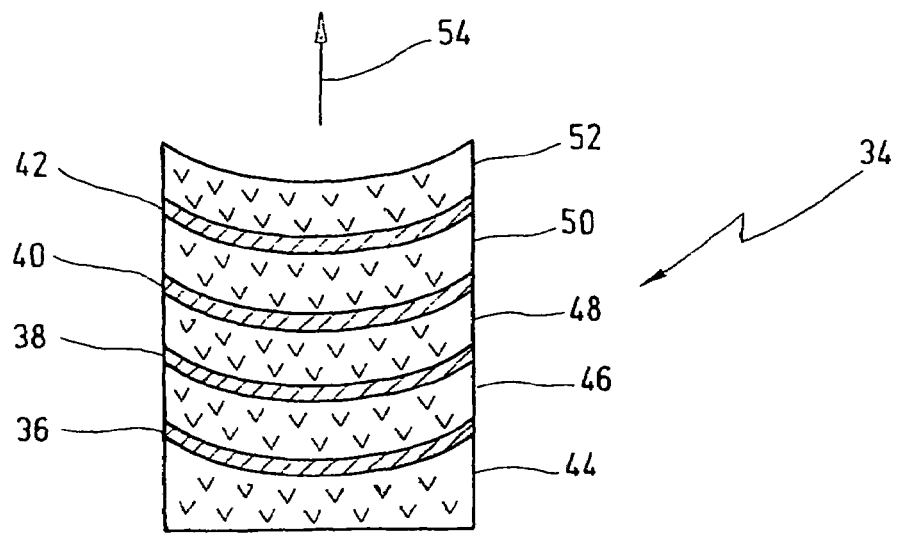
Fig.5
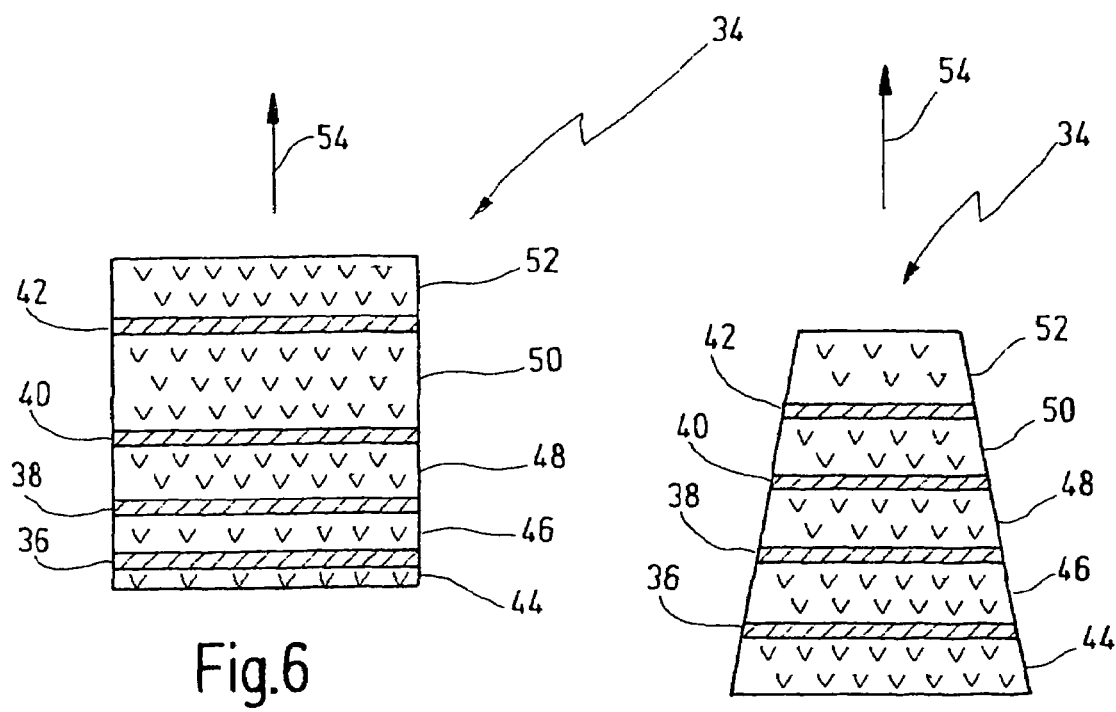
Fig.6
Fig.7

RADAR SENSOR FOR USE WITH AUTOMOBILES

This application is the national stage of PCT/EP2004/003433 filed on Apr. 1, 2004 and also claims Paris Convention priority of DE 103 22 371.1 filed on May 13, 2003.

BACKGROUND OF THE INVENTION

The invention concerns a radar sensor that emits pulsed radiation for automobile applications. The invention also concerns a method for the production of such a radar sensor. Radar sensors of this kind are known in the art. Automobile applications such as radar sensors are usually used to assistant parking, to monitor blind spots, to anticipate accidents (pre-crashed sensing), for starting/stopping operation or during driving with distance monitoring, and/or to regulate separations (cruise control support).

Towards this end, differing sensors are normally used for monitoring the environment of the vehicle and for detection of remote objects, with these different sensors operating at different radar frequencies. For near field observations, high spatial resolution is important (with respect to separation as well as angle), whereas the angular information is less important for large separations.

For the monitoring of separations at large range, radar sensors are conventionally used having a frequency of approximately 76 Gigahertz. These frequencies have, however, the associated disadvantages that the short wave lengths in the microwave region cannot be used together with conventional components.

In contrast thereto, so-called ISM frequencies of approximately 24 Gigahertz are used for near field monitoring. These frequencies can be irradiated in a wide band fashion. A wide band signal is desirable, since the spatial resolution of reflected objects, i.e. the smallest possible separation with which two separate objects can be recognized as being separate, is improved with increasing band width. In order to further improve the bandwidth, the conventional radar sensors are generally operated in a pulse manner, since the signal bandwidth increases with shorter pulse width.

The conventional radar sensor has a planer, slot-coupled patch antenna, which can be excited via an associated aperture in a metallic, ground surface and via a dielectric dispose between the ground surface and the radiation surface. Excitation via a feed network to the radar sensor, results in the irradiation of electromagnetic waves. The conventional radar sensors have a length and width of several centimeters and a depth of approximately up to 3 centimeters, so that they can be integrated into conventional bumpers of motor vehicles.

With the assistance of a plurality of radar sensors, it is possible to detect objects throughout a wide angular region using the triangulation procedure. The directional characteristics of the radiating and receiving antennas are thereby adjusted in a geometric fashion with the assistance of the interference principal and also with the assistance of signal phase differences or with signal travel time differences using approximately 4 to 6 patches (radiation surfaces) at 3 db in an angular range from approximately 15 to 25 degrees in one direction and approximately 7 degrees in the other direction.

An advantage of the flat antenna structures compared to conventional antennas is that they are more economical to produce and they also result in a compact and light weight construction which can be built using standard components and which is easily integrated into circuits having microstrip leads.

This economical principle is sufficient for small object detection ranges.

However, for larger separations of approximately 40 meters from the object, a relatively highly focused beam must be used, since ambient influences are otherwise excessive. Realization of such a strongly focused beam using a conventional planer antenna technology on the basis of the conventional interference principle would require a plurality of patches and are therefore a large amount of space. The antenna surfaces would then determine the size of the sensor and the size of future sensors would greatly exceed the size of current radar sensors.

Departing from this prior art, it is the object of the present invention to produce an economical radar sensor for automobile applications which, in addition to the detection of proximate objects, can also detect further removed objects while utilizing standard components and with one single radar sensor whose geometrical size is not substantially larger than the sizes of current conventional radar sensors.

SUMMARY OF THE INVENTION

This purpose is achieved in accordance with the radar sensor of the above mentioned kind in that the radar sensor has an antenna with at least one layered structured block which has metal layers disposed in accordance with the Yagi principle, each of which are separated from the other by means of a dielectric intermediate layer, wherein at least one of the metallic layers is excited by a feed network at a radar frequency.

Moreover, this purpose is achieved with a method of the above mentioned kind in an antenna of a radar sensor produced with at least one layered structured block having metal layers structured according to the Yagi principle each of which is separated from each other by an intermediate dielectric layer, wherein at least one of the metal layers is coupled to a feed network.

With these elements, the purpose of the invention is achieved. The radar sensor in accordance with the invention can be constructed for automobile applications in an economical fashion and can simultaneously detect the proximate range as well distant objects. Its size is comparable to that of conventional sensors. A conventional Yagi antenna is a longitudinal irradiator comprising a plurality of dipoles that effect the desired directionality. It is exited by radiative coupling. By replacing the metal patches used in conventional radar sensors with one or multi-layered block structures, an increased directionality is achieved.

The intermediate dielectric layers are preferentially made from ceramic having a dielectric constant between 5 and 50. The relatively high dielectric constant values of the ceramic decrease the wavelengths so that a relatively large number of layers can contribute to the Yagi principle without having an excessively high block height. In this manner, even one single layered structured block having metal layers disposed in accordance with the Yagi principle leads to substantial directionality.

It is furthermore preferred when at least two of the metal layers are excited by the feed network in a phase coupled manner via separate structures.

It is furthermore advantageous when individual layers of the layered structured block have at least regions that are trough shaped.

It is furthermore preferred when the layered structured blocks taper with increasing separation from the feed network coupling.

These configurations further increase the directionality of a layered structured block having metal layers disposed in accordance with the Yagi principle. This is the case for each individual element as well as for the combination of these elements.

It is furthermore preferred when the metal surfaces, which are disposed proximate to the radio frequency electromagnetic energy feed, are stacked in a denser manner than those, which are further removed.

This has led to improved excitation of the further removed layers. This feature can also be preferentially combined with the above-mentioned ones.

A further preferred embodiment is distinguished in that a plurality of the layered structured blocks are combined into a common structure, wherein the individual blocks are excited in a phase coupled fashion.

Such a phase directed feed of the radio frequency energy RF (radio frequency energy) into a plurality of blocks can further increase the directionality of a LTCC Yagi block configuration.

Furthermore, the radar sensor preferably has a plurality of the above-mentioned configurations, excited in a phase-coupled fashion.

This configuration also increases the directionality of the antenna. It is also preferred when the network has a radar frequency of 24 Gigahertz. This feature permits combination of the conventional wide band, near field observation in the ISM frequency region with the detection of further removed objects as achieved in accordance with the invention by means of directed irradiation.

With regard to the method, it is preferred when the dielectric intermediate layers having embedded metal layers are produced as LTCC layers (low temperature co-fired ceramics).

LTCC technology is suitable for the production of monolithic ceramic multi-layer systems in which electrically conducting material, such a metallic layers, can be integrated.

Further advantages can be extracted from the description and the associated figures.

Clearly, the above mentioned features and those to be described more closely below can be used not only in the particular combination given but also in other combinations or individually, without departing from the framework of the instant invention.

BRIEF DESCRIPTION OF THE DRAWINGS

Embodiments in the invention are described more closely below, illustrated in the drawings, and described in detail in the following description.

FIG. 5 shows a schematic cut representation of a layered structured block according to a further embodiment of the invention;

FIG. 6 shows a schematic representation of a layered structured block having various layer separations, and FIG. 7 shows a schematic representation of a layered structured block having a cross-section that tapers in the longitudinal direction.

DESCRIPTION OF THE PREFERRED EMBODIMENT

Figure 1:
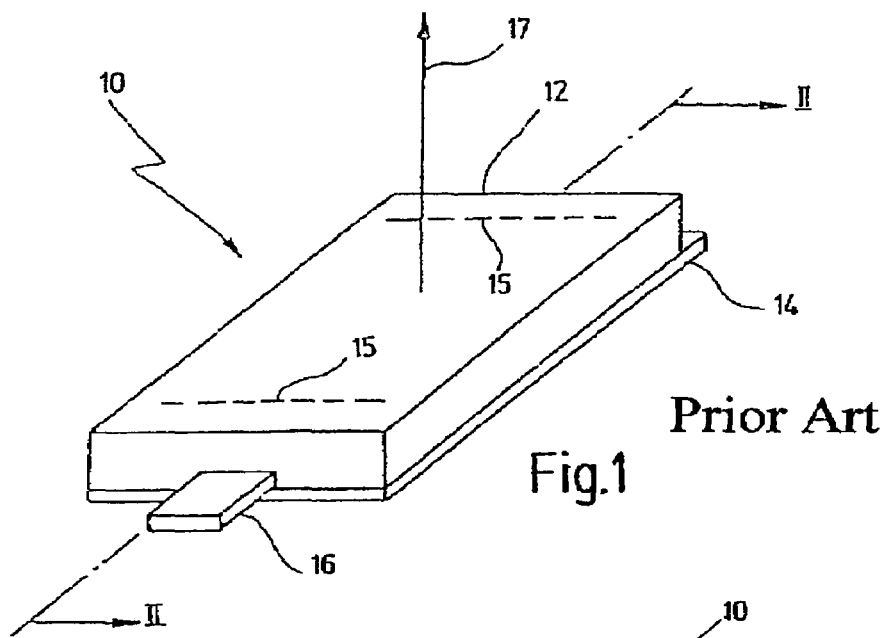
FIG. 1 shows a schematic overall view of a radar sensor for motor vehicle applications.

Reference symbol 10 of FIG. 1 designates a schematic overall view of a radar sensor having a housing 12, which is sealed by a lid 14. The dash lines 15 indicate the direction of orientation of the radiation elements within the housing 12. Reference symbol 16 designates a connecting element by means of which the radar sensor 10 can receive e.g. a power supply voltage and/or by means of which the radar sensor 10 can send or receive signals to and from a controlling apparatus of a motor vehicle. The arrow designated with reference symbol 17 indicates the direction of the longitudinal axis of the motor vehicle.

The orientation of the radar sensor 10 relative to the direction 17 of the longitudinal axis represents the typical assembled position of the radar sensor 10 in a motor vehicle application. However, the invention is clearly not limited to such a relative direction between the radar sensor 10 and the direction 17 of the longitudinal axis of the motor vehicle.

Figure 2:
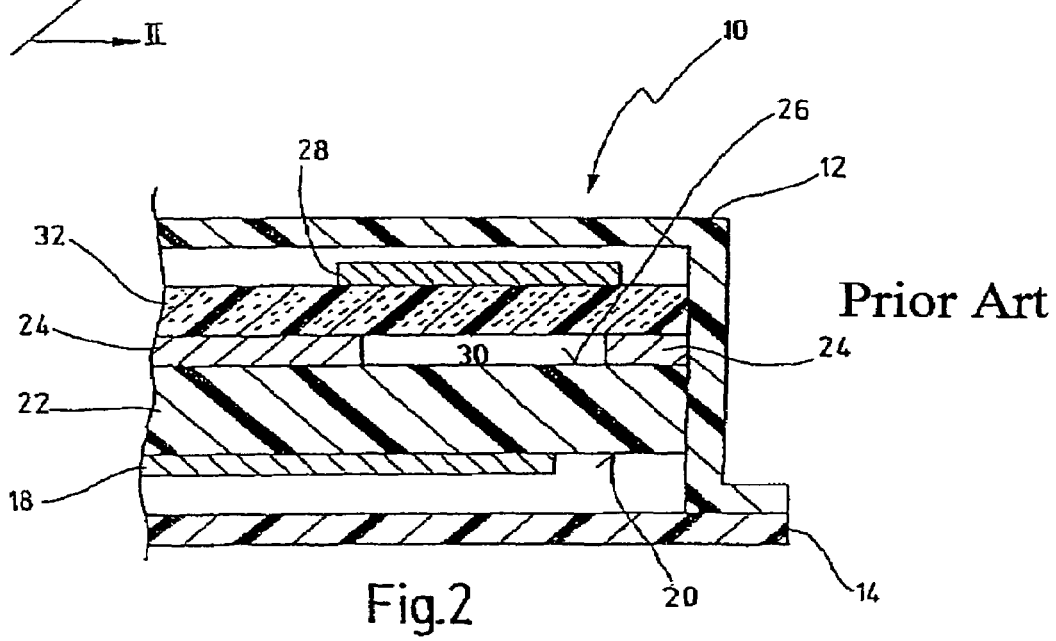
FIG. 2 shows a schematic cut representation of the radar sensor according to FIG. 1 with an inner construction known in prior art.

FIG. 2 shows a conventional internal construction of the radar sensor 10 according to FIG. 1, in partial section. Reference symbol 18 of FIG. 2 represents a feed network which is connected to the connecting elements 16 of FIG. 1 and which is disposed on a first side 20 of a radio frequency substrate 22. A metallic ground surface 24 is disposed on a second side 26 of the radio frequency substrate 22. The radar sensor 10 also has at least one radiative surface 28 (patch), which is excited by an input network 18 via an opening 30 in the metallic ground surface 34 and via a dielectric 32 disposed between the ground surface 24 and the radiation surface 28 to irradiate electromagnetic waves. In the conventional radar sensor, the radiation surface is supported and borne by the dielectric 32. The dielectric 32 of the conventional radar sensor is generally made from hardened foam.

Figure 3:
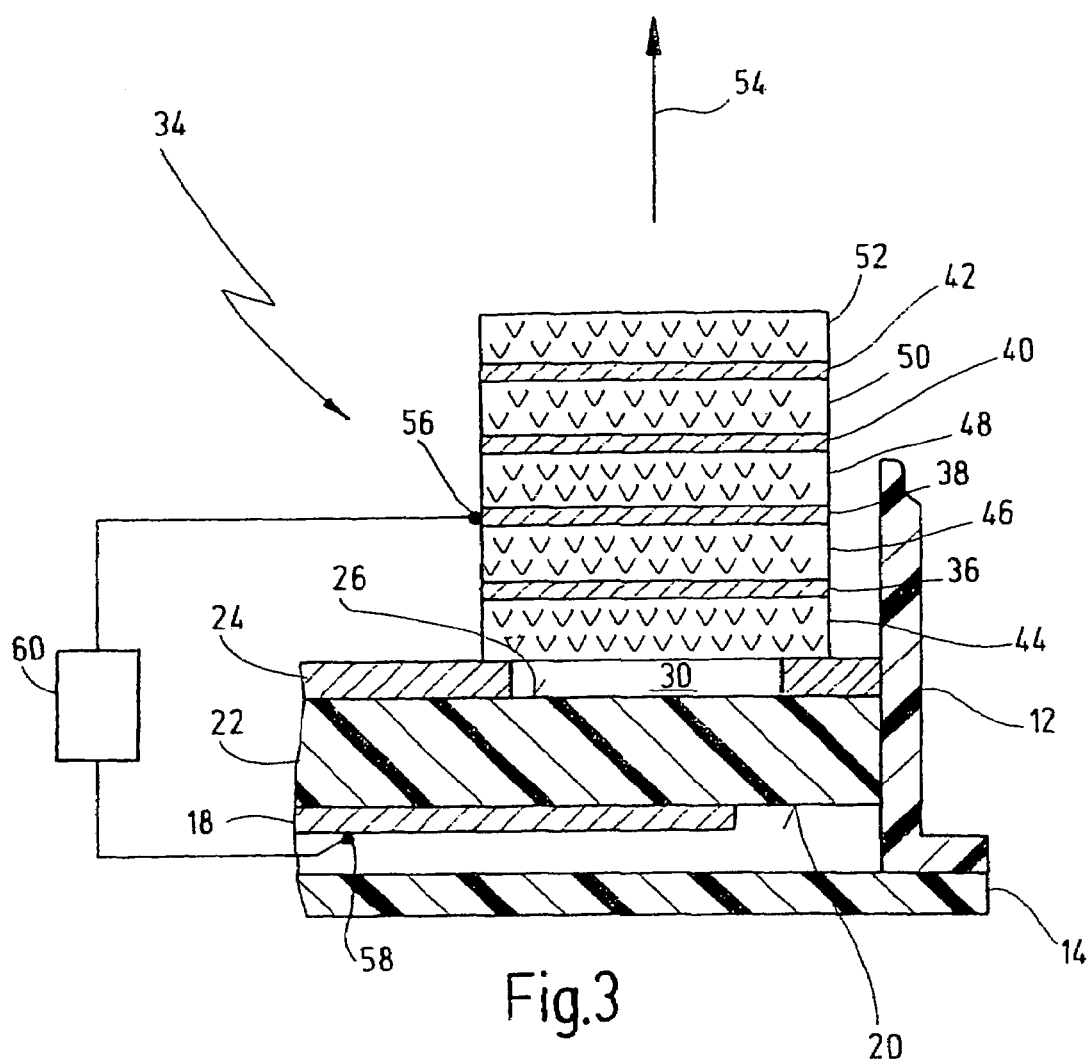
FIG. 3 shows a schematic cut representation of a layered structured block embodiment of the invention that replaces the radiation layers (patches) of FIG. 2.

FIG. 3 shows a first configuration of a radiative device having the features of the inventive radar sensor. Reference symbol 34 designates a layered structured block, which has metal layers 36, 38, 40 and 42 disposed in accordance with the Yagi principle. The metal layers 36, 38, 40 and 42 are embedded in dielectric layers 44, 46, 48, 50 and 52. The configuration of the metal layers 36, 38, 40 and 42 thereby represents a Yagi configuration.

A first metal layer 36 is coupled to a feed network 18 by means of a first dielectric layer 24, an opening 30, a metallic ground surface 24, and the radio frequency substrate 22. The feed network 18 generates electrical oscillations in the first metallic surface 36 which excite the additional metallic surfaces 38, 40 and 42 via the additional dielectric layers 46, 48 and 50. The Yagi configuration amplifies the directional properties of the electromagnetic waves irradiated from the individual metallic surfaces. Arrow 54 indicates the principal irradiation direction.

Complementary, additional metallic layers can be coupled to the feed network 18. Through proper phased input of radio frequency electromagnetic energy to the metallic surfaces 36, 38 that are stacked in the radiation direction, the directional properties of a block are increased. FIG. 3 shows such a multiple input having a network connection 58 and a connection 56 to a further metallic surface 38 in addition to the coupling by means of the aperture 30 and the associated electrically conducting connection of a network connection 58. Reference symbol 60 indicates a phase displaceable element, e.g. a capacitance and/or an inductance and/or an optionally controllable network of capacitances and/or inductive elements. Such an additional connection is optional: the object of the invention is also realized with the coupling of only one metallic surface 36 to the feed network 18.

As shown in FIG. 3, the metal layers are embedded in an equidistant fashion in ceramic. This configuration is, however, not absolutely necessary, as will be described more closely below.

Ceramic material is preferred for the dielectric layers 44, 46, 48, 50 and 52, since the higher dielectric constant of ceramic leads to a large decrease in the wavelengths of the electromagnetic waves, which are transmitted inside the block 34. As a result thereof, a relative large number of metal layers can be stacked together with alternating ceramic layers without having the height of the block 34 be excessively large. In this manner, an improved directionality is achieved even with one single block 34.

In order to further improve the directionality, a plurality of such Yagi blocks 34 can be coupled to each other in groups. With proper phase driving of the individual blocks 34 within the group, a constructive interference among the electromagnetic waves emanating from each individual Yagi block 34 can be achieved, leading to an improved directionality. Towards this end, six or groups of six Yagi blocks can be directed in a linear fashion or in a plurality of lines 15 (see FIG. 1).

The directionality can be further improved when a plurality of such phased coupled groups produce mutual constructive interference. Towards this end, groups of patches can be combined with groups of Yagi blocks. In this fashion, a three-by-six configuration with two outer rows of patches and a middle row of six Yagi blocks can be combined.

Each Yagi block 34 is preferentially produced using LTCC technology (low temperature co-fired ceramic).

This technology is particularly good for the production of monolithic structures made from ceramic and having integrated metallic layers. Within the framework of the LTCC technology, a raw, glass ceramic foil is initially produced having an organic binder. Glass ceramic consists essentially of a ceramic material and a glass material. Openings are subsequently produced in the raw ceramic foil and filled with the subsequent metal layers. The raw ceramic foils are then stacked together with the metallic layers and laminated into a composite. The composite is then sintered into a block having monolithic, multi-layer construction.

Following the sintering process, the metallic layers 36, 38, 40 and 42 of the antenna are embedded in the ceramic of the multi-layered structure of the block 34. The dimensions of the antenna depend on the effective dielectric constants of the ceramic. The higher the ceramic dielectric constant, the smaller is the height of the block 34.

Figure 4:
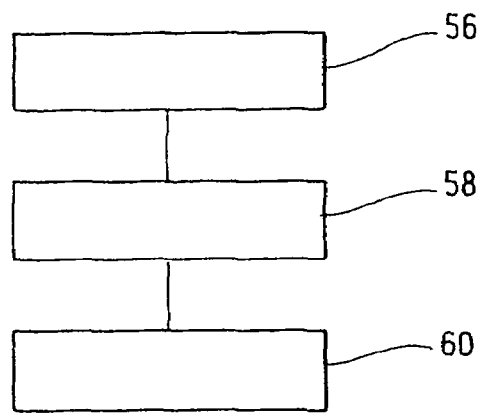
FIG. 4 shows an embodiment of a method in accordance with the invention.

FIG. 4 illustrates a method for the production of a radar sensor in accordance with the invention. Towards this end, in a first step 62, at least one layered structured block 34 is manufactured having metal layers 36, 38, 40 and 42 disposed in accordance with the Yagi principle, each layer being separated from the next by means of a dielectric intermediate layer 46, 48 and 50. The number of metal and separating, ceramic intermediate layers is not confined to a particular number. The larger the number of layers, the better the directionality. The number of layers could be limited by specifications for a maximum constructional height of the radar sensor 10.

The step 56 is preferentially followed by the above-mentioned LTCC technology. In a second step 64, the block is coupled to a feed network 18 and, in a third step 66 is embedded in a housing. The coupling to the feed network 18 can be effected via an aperture 30 in one of the ground surfaces 24 which is disposed on one side of a radio frequency substrate 22, opposite to a feed network 18. The coupling can, however, also be effected in other ways e.g. by means of a galvanic coupling between the first metal layer 36 and the feed network 18.

FIG. 5 shows a schematic section of a layered structured block 34 according to an additional embodiment of the invention. In this embodiment, the metal surfaces 36, 38, 40 and 42 as well as the associated ceramic layers 44, 46, 48, 50 and 52 are trough shaped (concave). This configuration leads to improved directionality.

FIG. 6 shows a layered structured block 34 having metal layers 36, 38, 40 and 42 which are not embedded in the ceramic at equal separations. The densely stacked metal layers proximate the input of the radio frequency electromagnetic energy via the aperture 30, form a transitional zone for improved excitation of the more distant outer metal surfaces layers.

FIG. 7 shows a schematic representation of a layered structured block 34 having a cross-section that tapers in a longitudinal direction. This embodiment also leads to improved directionality of the block 34.

The invention claimed is:

1. A radar sensor for emitting pulsed radiation in motor vehicle applications, the sensor comprising:
   an antenna having at least one layered block, said layered block having metallic layers disposed in accordance with a Yagi principle, wherein each of said metallic layers is separated from an other one of said metallic layers by an Intermediate dielectric layer; and
   a feed network for exciting at least one of said metallic layers at a radar frequency, wherein said layered block tapers with increasing separation from a coupling to said feed network.

2. The radar sensor of claim 1, wherein each respective intermediate dielectric layer has a dielectric constant between 5 and 50.

3. The radar sensor of claim 1, wherein at least two of said metallic layers are excited by said feed network in a phase coupled manner using separate structures.

4. The radar sensor of claim 1, wherein individual layers of said layered block have at least regions which are trough shaped.

5. The radar sensor of claim 1, wherein a plurality of layered structured blocks are combined into a formation and excited in a phase coupled fashion.

6. The radar sensor of claim 1, further comprising a plurality of said tapering layered blocks which are excited in a phased coupled fashion.

7. The radar sensor of claim 1, wherein said radar frequency of said feed network is 24 gigahertz.

8. A radar sensor for emitting pulsed radiation in motor vehicle applications, the sensor comprising:
   an antenna having at least one layered block, said layered block having metallic layers disposed in accordance with a Yagi principle, wherein each of said metallic layers is separated from an other one of said metallic layers by an intermediate dielectric layer; and
   a feed network for exciting at least one of said metallic layers at a radar frequency, wherein metallic surfaces which are proximate to a point of introduction of radio-frequency electromagnet energy are more densely stacked than metal surfaces disposed further removed therefrom.

9. A method for producing a radar sensor emitting pulsed radiation in motor vehicle applications, the method comprising the steps of:
 a) constructing an antenna having at least one layered block, said layered block having metallic layers disposed in accordance with a Yagi principle, wherein each of said metallic layers is separated from an other one of said metallic layers by an intermediate dielectric layer; and
 b) exciting at least one of said metallic layers at a radar frequency with a feed network, wherein said layered block tapers with increasing separation from a coupling to said feed network.

10. The method of claim 9, wherein said intermediate dielectric layers are LTCC layers.

* * * * *